United States Patent
Schmalstieg et al.

(10) Patent No.: US 12,020,378 B2
(45) Date of Patent: Jun. 25, 2024

(54) COMPRESSED GEOMETRY RENDERING AND STREAMING

(71) Applicant: QUALCOMM Technologies, Inc., San Diego, CA (US)

(72) Inventors: Dieter Schmalstieg, Graz (AT); Markus Steinberger, Graz (AT); Daniel Mlakar, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/400,065

(22) Filed: Aug. 11, 2021

(65) Prior Publication Data

US 2022/0058872 A1    Feb. 24, 2022

Related U.S. Application Data

(60) Provisional application No. 63/067,129, filed on Aug. 18, 2020.

(51) Int. Cl.
  *G06T 17/20* (2006.01)
  *G06T 9/00* (2006.01)
  *G06T 15/00* (2011.01)
  *G06T 17/10* (2006.01)

(52) U.S. Cl.
  CPC ............ *G06T 17/205* (2013.01); *G06T 9/001* (2013.01); *G06T 15/005* (2013.01); *G06T 17/10* (2013.01)

(58) Field of Classification Search
  None
  See application file for complete search history.

(56) References Cited

U.S. PATENT DOCUMENTS

| 6,459,429 B1* | 10/2002 | Deering | G06T 17/20 345/423 |
| 2003/0112240 A1* | 6/2003 | Cerny | G06T 17/205 345/428 |
| 2009/0184956 A1* | 7/2009 | Kim | G06T 9/20 345/420 |

(Continued)

OTHER PUBLICATIONS

Meyer et al., "Data-Parallel Decompression of Triangle Mesh Topology," Oct. 2012, Computer Graphics Forum, vol. 31, Issue 8, pp. 2541-2553 (Year: 2012).*

(Continued)

*Primary Examiner* — Andrew G Yang
(74) *Attorney, Agent, or Firm* — QUALCOMM Incorporated

(57) ABSTRACT

The present disclosure relates to methods and apparatus for graphics processing. The apparatus may identify at least one mesh associated with at least one frame. The apparatus may also divide the at least one mesh into a plurality of groups of primitives, each of the plurality of groups of primitives including at least one primitive and a plurality of vertices. The apparatus may also compress the plurality of groups of primitives into a plurality of groups of compressed primitives, the plurality of groups of compressed primitives being associated with random access. Additionally, the apparatus may decompress the plurality of groups of compressed primitives, at least one first group of the plurality of groups of compressed primitives being decompressed in parallel with at least one second group of the plurality of groups of compressed primitives.

19 Claims, 7 Drawing Sheets

(56) References Cited

U.S. PATENT DOCUMENTS

| | | | |
|---|---|---|---|
| 2010/0045668 A1* | 2/2010 | Lee ................. | H04W 28/06 |
| | | | 345/419 |
| 2010/0134494 A1* | 6/2010 | Lim ............... | H04N 21/41407 |
| | | | 345/426 |
| 2011/0185071 A1 | 7/2011 | Schmieder et al. | |
| 2012/0200559 A1* | 8/2012 | Ahn ................. | H04N 19/20 |
| | | | 345/419 |
| 2014/0185668 A1* | 7/2014 | Jiang ............... | H03M 7/6088 |
| | | | 375/240.08 |
| 2018/0165836 A1* | 6/2018 | Curington ........... | G06T 17/05 |
| 2018/0232912 A1* | 8/2018 | Nevraev ............. | G06T 15/80 |
| 2018/0293787 A1* | 10/2018 | Labbe ............... | G06T 15/40 |
| 2018/0342099 A1* | 11/2018 | Paltashev ........... | G06T 17/20 |
| 2019/0236827 A1 | 8/2019 | Hakura et al. | |
| 2020/0311042 A1 | 10/2020 | Doyle | |

OTHER PUBLICATIONS

International Search Report and Written Opinion—PCT/US2021/045811—ISA/EPO—Nov. 24, 2021.
Kubisch C., "Introduction to Turing Mesh Shaders | NVIDIA Developer Blog", Sep. 17, 2018 (Sep. 17, 2018), XP055695710, 18 pages, Retrieved from the Internet: URL: https://devblogs.nvidia.com/introduction-turing-mesh-shaders/ [retrieved on May 14, 2020] section "Introduction to Turing Mesh Shaders" section "Motivation" section "Mesh Shading Pipeline".

* cited by examiner

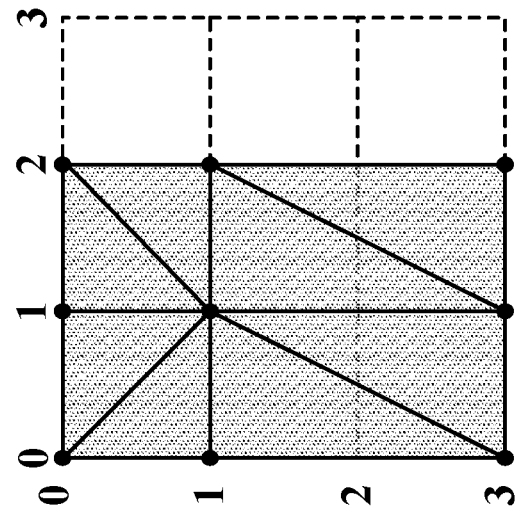
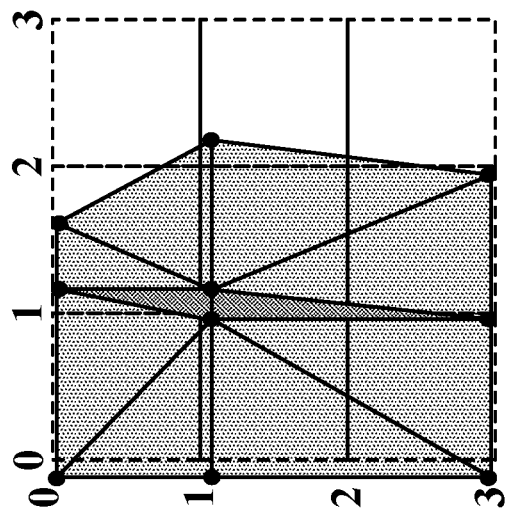
FIG. 3

COMPRESSED GEOMETRY RENDERING AND STREAMING

CROSS REFERENCE TO RELATED APPLICATION(S)

This application claims the benefit of U.S. Provisional Application Ser. No. 63/067,129, entitled "METHODS AND APPARATUS FOR COMPRESSED GEOMETRY RENDERING AND STREAMING" and filed on Aug. 18, 2020, which is expressly incorporated by reference herein in its entirety.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

BRIEF SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a server, a client device, a central processing unit (CPU), a graphics processing unit (GPU), or any apparatus that may perform graphics processing. The apparatus may identify at least one mesh associated with at least one frame. The apparatus may also divide the at least one mesh into a plurality of groups of primitives, each of the plurality of groups of primitives including at least one primitive and a plurality of vertices. The apparatus may also compress the plurality of groups of primitives into a plurality of groups of compressed primitives, the plurality of groups of compressed primitives being associated with random access. Additionally, the apparatus may store the plurality of groups of compressed primitives in a buffer or memory. The apparatus may also transmit the plurality of groups of compressed primitives. The apparatus may also decompress the plurality of groups of compressed primitives, at least one first group of the plurality of groups of compressed primitives being decompressed in parallel with at least one second group of the plurality of groups of compressed primitives. Further, the apparatus may render, upon decompressing the plurality of groups of compressed primitives, at least one image corresponding to the plurality of groups of compressed primitives.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 illustrates a diagram of an example mesh transformation in accordance with one or more techniques of this disclosure.

DETAILED DESCRIPTION

Figure 1:
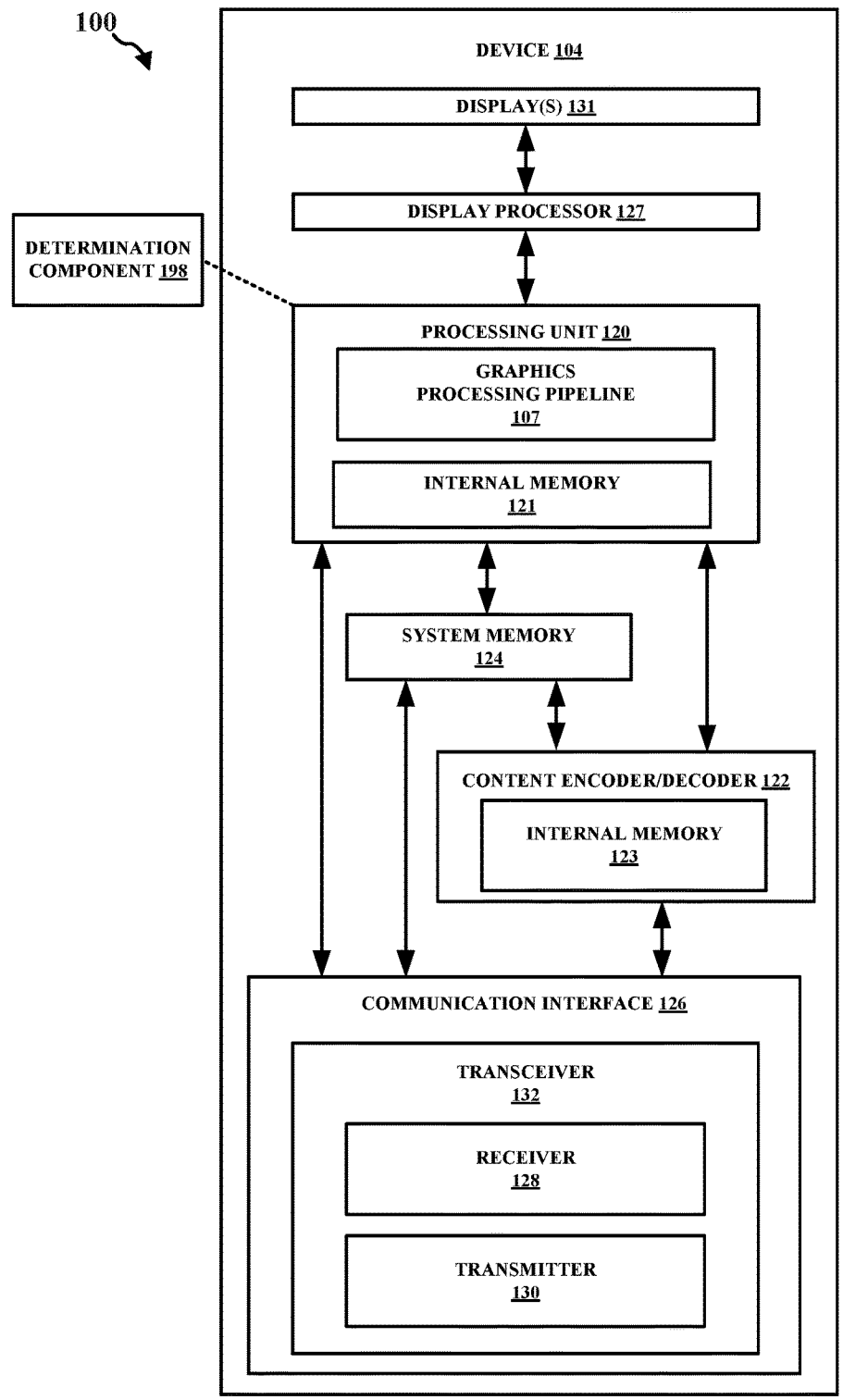
FIG. 1 is a block diagram that illustrates an example content generation system in accordance with one or more techniques of this disclosure.

Some types of graphics processing units (GPUs) may have restricted memory, such that geometric modeling may become more detailed. For instance, memory bandwidth (BW) may be a limiting factor on some types of GPUs. The locality of memory accesses may be important for high performance, as there may be no reason to expect cache-coherent layouts out of the box. Additionally, mobile devices may be even more limited than GPUs in terms of memory size and bandwidth. Some mobile devices may utilize geometric compression to store large meshes in memory. On mobile devices, memory access may consume a high amount of power. Streaming geometry over a network may utilize the partitioning of geometric data into packets, which may inflict computational overheads. Mesh shaders are one way to approach cache-coherent geometry rendering. For instance, a matrix-based mesh layout optimization may be an improved approach to geometry rendering. Aspects of the present disclosure may create independent meshlets with a strong local coherence. Aspects of the present disclosure may also utilize compressed meshlets. Additionally, aspects of the present disclosure may render directly from a compressed representation in a mesh shader.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "products of 3D graphics design," their rendition, i.e., "images," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example system 100 configured to implement one or more techniques of this disclosure. The system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to identify at least one mesh associated with at least one frame. The determination component 198 may also be configured to divide the at least one mesh into a plurality of groups of primitives, each of the plurality of groups of primitives including at least one primitive and a plurality of vertices. The determination component 198 may also be configured to compress the plurality of groups of primitives into a plurality of groups of compressed primitives, the plurality of groups of compressed primitives being associated with random access. The determination component 198 may also be configured to store the plurality of groups of compressed primitives in a buffer or memory. The determination component 198 may also be configured to transmit the plurality of groups of compressed primitives. The determination component 198 may also be configured to decompress the plurality of groups of compressed primitives, at least one first group of the plurality of groups of compressed primitives being decompressed in parallel with at least one second group of the plurality of groups of compressed primitives. The determination component 198 may also be configured to render, upon decompressing the plurality of groups of compressed primitives, at least one image corresponding to the plurality of groups of compressed primitives.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

GPUs may render images in a variety of different ways. In some instances, GPUs may render an image using rendering or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. Moreover, in the binning pass, different primitives may be shaded in certain bins, e.g., using draw calls. In some aspects, during the binning pass, a visibility stream may be constructed where visible primitives or draw calls may be identified.

In some aspects of rendering, there may be multiple processing phases or passes. For instance, the rendering may be performed in two passes, e.g., a visibility pass and a rendering pass. During a visibility pass, a GPU may input a rendering workload, record the positions of primitives or triangles, and then determine which primitives or triangles fall into which portion of a frame. In some aspects of a visibility pass, GPUs may also identify or mark the visibility of each primitive or triangle in a visibility stream. During a rendering pass, a GPU may input the visibility stream and process one portion of a frame at a time. In some aspects, the visibility stream may be analyzed to determine which primitives are visible or not visible. As such, the primitives that are visible may be processed. By doing so, GPUs may reduce the unnecessary workload of processing or rendering primitives that are not visible.

In some aspects, rendering may be performed in multiple locations and/or on multiple devices, e.g., in order to divide the rendering workload between different devices. For example, the rendering may be split between a server and a client device, which may be referred to as "split rendering." In some instances, split rendering may be a method for bringing content to user devices or head mounted displays (HMDs), where a portion of the graphics processing may be performed outside of the device or HIVID, e.g., at a server.

Split rendering may be performed for a number of different types of applications, e.g., virtual reality (VR) applications, augmented reality (AR) applications, and/or extended reality (XR) applications. In VR applications, the content displayed at the user device may correspond to man-made or animated content, e.g., content rendered at a server or a client device. In AR or XR content, a portion of the content displayed at the user device may correspond to real-world content, e.g., objects in the real world, and a portion of the content may be man-made or animated content. Also, the man-made or animated content and real-world content may be displayed in an optical see-through or a video see-through device, such that the user may view real-world objects and man-made or animated content simultaneously. In some aspects, man-made or animated content may be referred to as augmented content, or vice versa.

Split XR or AR systems may also introduce latency when delivering the rendered content to the client display. In some aspects, this latency may be even higher when rendering occurs on a server than compared to client rendering, but it may also enable more complex XR or AR applications. In addition, there may be non-negligible latency between the time a camera pose is computed and the time the content appears on the client display. For instance, a certain amount of latency may be present in split XR or AR systems.

Some types of graphics processing units (GPUs) may have restricted memory, such that geometric models may not be more detailed. For instance, memory bandwidth (BW) may be a limiting factor in some types of GPUs, such that the performance of the GPU is limited by the amount of memory bandwidth. Also, the locality of memory accesses may be important for high performance at GPUs. For instance, there may be no reason to expect cache-coherent layouts out-of-the-box, so in order not to compromise rendering speed, improvements to local memory access may be needed if cache-coherent layouts may not be relied upon.

Additionally, mobile devices may be even more limited than GPUs in terms of memory size and bandwidth. For example, some mobile devices may utilize geometric compression to store large meshes in a memory. On some types of mobile devices, memory access may consume a high amount of power. Further, streaming geometry over a network may utilize the partitioning of geometric data into packets, which may inflict computational overheads.

Mesh shaders are one way to approach cache-coherent geometry rendering. It may be beneficial for GPUs to create independent meshlets with a strong local coherence. Further, it may be beneficial for GPUs to allow for compressed meshlets. It may also be beneficial for GPUs to render directly from a compressed representation in a mesh shader.

Aspects of the present disclosure may create/generate independent meshlets with a strong local coherence. For example, GPUs according to aspects of the present disclosure may create independent meshlets with a strong local coherence. Aspects of the present disclosure may also create/generate compressed meshlets or utilize compressed meshlets. For instance, GPUs according to aspects of the present disclosure may create or utilize compressed meshlets. Aspects of the present disclosure may also render directly from a compressed representation in a mesh shader. For example, GPUs according to aspects of the present disclosure may render directly from a compressed representation in a mesh shader.

There are a number of benefits or advantages to the aforementioned approaches of aspects of the present disclosure. For instance, aspects of the present disclosure may include memory savings, such as by storing large meshes in a memory in compressed form. Aspects of the present disclosure may also include memory bandwidth savings, which may be particularly important on mobile devices. Aspects of the present disclosure may also allow for implicit, on-the-fly level-of-detail (LOD) geometry generation. In some instances, aspects of the present disclosure may utilize real-time geometry streaming via a connection-less user datagram protocol (UDP).

Aspects of the present disclosure may utilize a number of different methods for encoding. For instance, aspects of the present disclosure may optimize mesh locality. In some aspects of the present disclosure, certain types of primitives may reside in a certain type of memory or buffer, e.g., spatially close primitives may reside closely in a memory or a buffer.

Aspects of the present disclosure may utilize a reverse Cuthill-McKee method, which may utilize connectivity and degree reordering. Aspects of the present disclosure may also utilize nested dissection or graph partitioning. Further, aspects of the present disclosure may utilize global (e.g., mesh) and local (e.g., meshlet) optimizations. Aspects of the present disclosure may also consider vertex locality approaches, as well as optimizing triangle locality.

Figure 2:
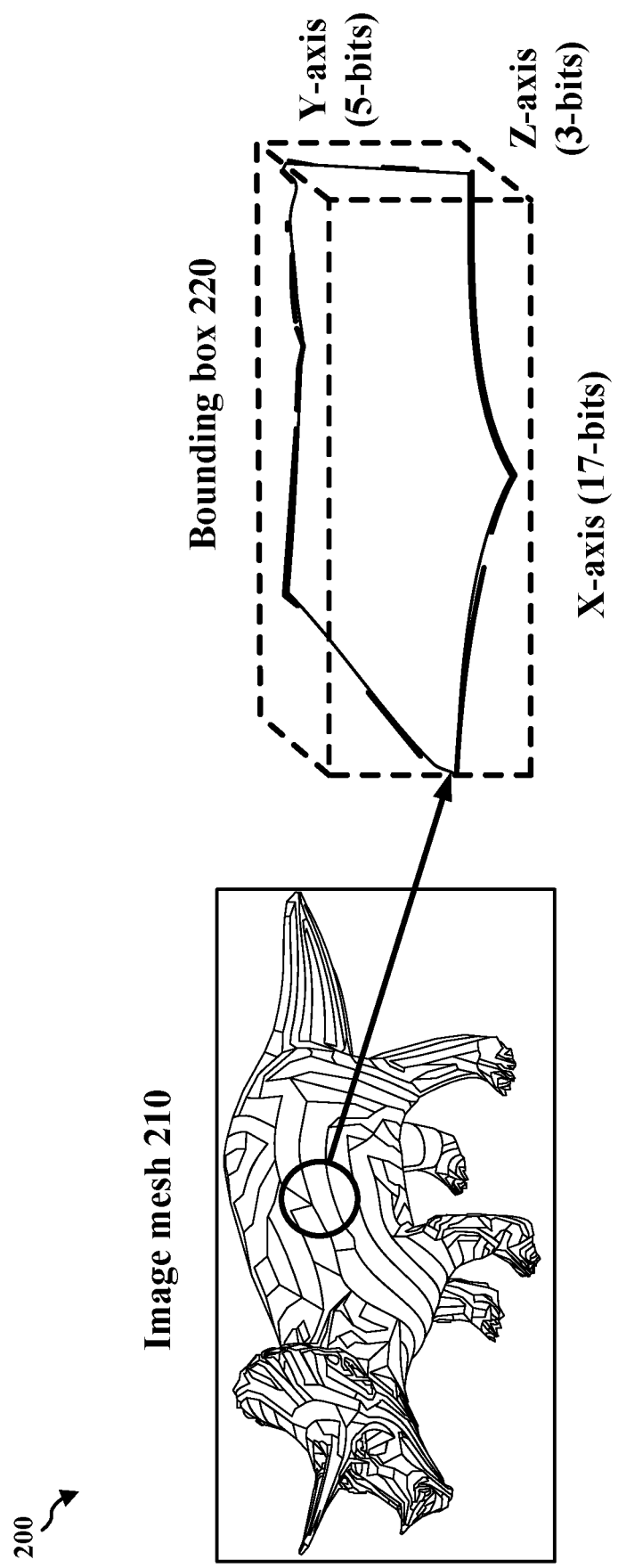
FIG. 2 illustrates a diagram of an example encoding method in accordance with one or more techniques of this disclosure.

FIG. 2 illustrates diagram 200 of an example encoding method in accordance with one or more techniques of this disclosure. Diagram 200 in FIG. 2 includes image mesh 210 including a plurality of meshlets and bounding box 220. Bounding box 220 includes an x-axis (e.g., 17-bits), a y-axis (e.g., 5-bits) and a z-axis (e.g., 3-bits). As shown in FIG. 2, aspects of the present disclosure may generate meshlets, which may traverse optimized mesh faces. Additionally, aspects of the present disclosure may aggregate primitives/triangles until a maximum number is reached or any edge of a bounding box (BB) exceeds a threshold. For example, the primitives/triangles of image mesh 210 may be aggregated until a maximum number is reached or any edge of a bounding box 220 exceeds a threshold. Also, FIG. 2 shows that aspects of the present disclosure may transform a bounding box into a unit cube including contained vertices.

Additionally, aspects of the present disclosure may utilize vertex encoding, such as from a position in a unit cube. In some aspects, the vertex encoding may be a uniform quantization, e.g., a float to fixed-point. For instance, an individual number of bits may be utilized per dimension x, y, z, which may be precision proportional to bounding box dimensions. This may be similar to other vertex attributes, such as normal and textures. In some instances, aspects of the present disclosure may utilize an output per meshlet, which may be an affine bounding box transform with a generalized strip and/or quantized vertices.

Aspects of the present disclosure may also utilize two pass encoding. In two pass encoding, an encoded meshlet size may be a multiple of the cache-line size. In some aspects, two pass encoding may utilize a first pass to collect statistics. Aspects of the present disclosure may also utilize a second pass to make a final choice of a number of primitives/triangles per meshlet. In the second pass, aspects of the present disclosure may fix vertex quantization artifacts, such as gaps at meshlet boundaries, by allowing a higher bitrate for vertices. Also, in the second pass, aspects of the present disclosure may combine this with post-decoding quantization used for LOD geometry generation on-the-fly.

In some aspects, a task shader may spawn one mesh shader (MS) for each meshlet. A task shader may also decide on a discrete LOD, e.g., one meshlet set per LOD. The task shader may also perform frustum culling. Also, the MS may read the compressed meshlet data into a GPU cache. In one aspect, in a first step of decoding, one MS thread may decode one vertex into a shared memory. In the first step, aspects of the present disclosure may fetch fixed-point vertex coordinates, as well as transform them with a bounding box matrix. In a second step of decoding, one MS thread may consume one triplet of strip indices. In some aspects, the triplets may be overlapping. Also, degenerate triplets, e.g., double vertex or a reset flag, may be discarded. Further, too many degenerate triangles may correspond to a lower yield and/or no additional latency.

FIG. 3 illustrates diagram 300 of an example mesh transformation in accordance with one or more techniques of this disclosure. Diagram 300 in FIG. 3 displays a single meshlet both before quantization and after quantization. For instance, meshlet 310 is before quantization and meshlet 320 is after quantization. Both meshlet 310 and meshlet 320 include a number of vertices, e.g., vertices 0, 1, 2, and 3. As shown in FIG. 3, aspects of the present disclosure may generate view-dependent LOD geometry on-the-fly. For each decoded meshlet in a MS, aspects of the present disclosure may transform meshlet triangles to a world-space. For example, the quantization in FIG. 3 transforms meshlet 310 into meshlet 320. Aspects of the present disclosure may quantize world-space vertices based on a logarithmic camera distance or a world space or object space aligned regular grid. If triangles are degenerate, aspects of the present disclosure may discard them, such that they may not leave the MS.

Figure 4:
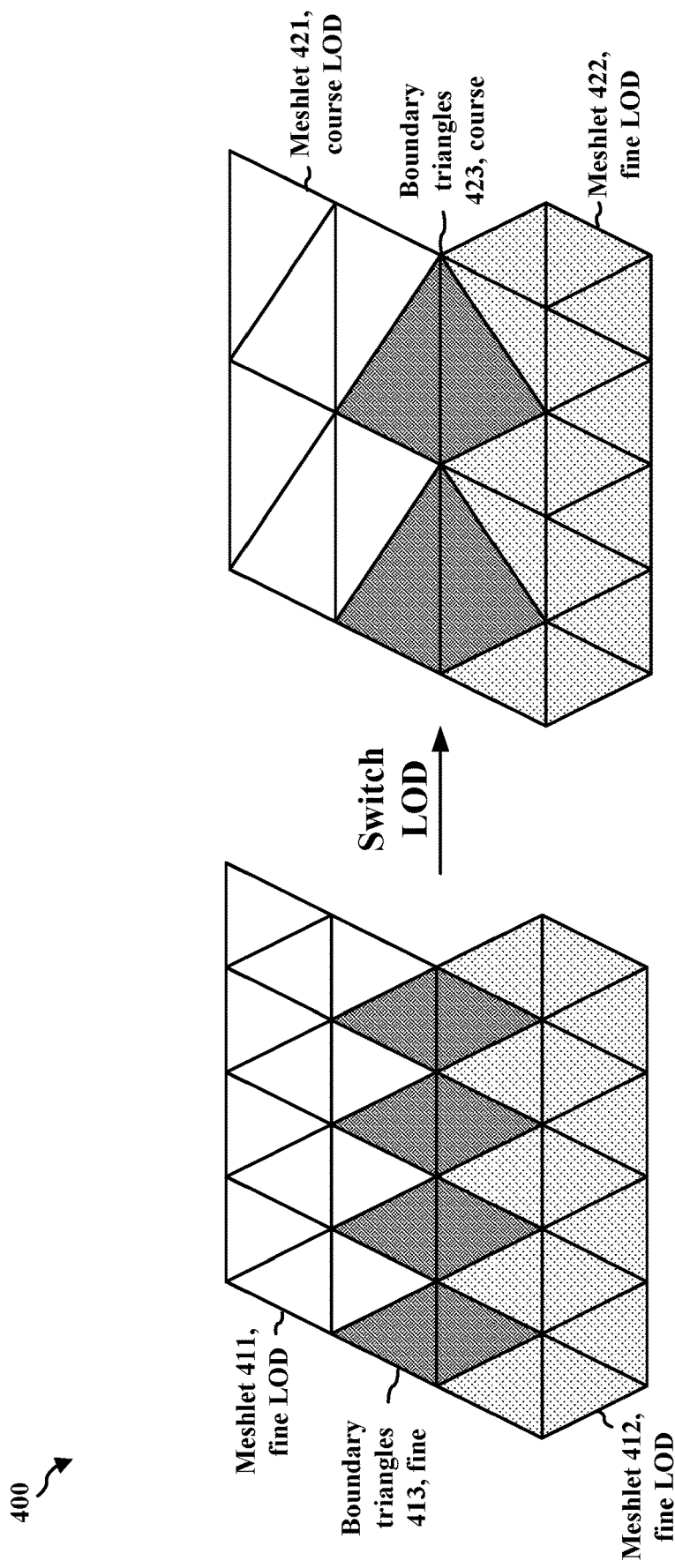
FIG. 4 illustrates a diagram of an example mesh transformation in accordance with one or more techniques of this disclosure.

FIG. 4 illustrates diagram 400 of an example mesh transformation in accordance with one or more techniques of this disclosure. Diagram 400 in FIG. 4 displays meshlets before and after switching a LOD. For instance, meshlets 410 are before switching LOD and meshlets 420 are after switching LOD. Meshlet 411 and meshlet 412 are neighbors and may have a common boundary. The boundary triangles 413 on both sides may be grouped into a separate part of the mesh. This may decouple the choice of LOD for meshlet 411 and meshlet 412. On the right hand side, meshlet 421 uses a coarse LOD and meshlet 422 uses a fine LOD. The boundary triangles 423 are also simplified (there are fewer triangles), but the triangle count of meshlet 422 may remain unchanged (the boundary vertices of meshlet 422 are moved.

In some aspects, geometric LOD on-the-fly generations may be useful in client-server environments, e.g., vector streaming. On-the-fly LOD geometry generations on a client device may be used to dynamically reduce a rasterizer load. If a client device already has detailed LOD generation, the server may compute a coarse LOD and shade the geometry. Also, a server may transmit a coarse shading and/or may not transmit geometry. The client device may also compute coarse LOD generations on-the-fly to apply the shading.

Aspects of the present disclosure may also utilize a user datagram protocol (UDP) for efficient streaming of geometry. In some instances, UDP may be connectionless and include a minimum protocol overhead. In UDP for efficient streaming of geometry, there may be no built-in error correction or retransmission mechanism. Using UDP for efficient streaming of geometry may also be an efficient custom solution with a simple acknowledgement (ACK) or negative ACK (NACK) scheme to prompt retransmission. UDP may also use a static LOD generation to transmit fallback geometry.

In some aspects, meshlets may be self-contained, such that one meshlet may be packed into a single UDP packet. Meshlets may also be decompressed and rendered independently. Missing packets may cause small, transient holes in objects and/or vanish as retransmissions arrive. Further, there may be no need to wait for retransmissions, as the rendering may continue with a temporary and minor loss of fidelity.

Aspects of the present disclosure may include a system for real-time rendering and streaming of geometry, which may split the mesh into cache-coherent meshlets and transform them into a compressed representation by taking advantage of the geometric locality in the meshlet. Aspects of the present disclosure may also include a system that transfers self-contained, compressed meshlets via UDP packets over the network. Additionally, aspects of the present disclosure may include a system that decodes the compressed meshlets in mesh shaders. Aspects of the present disclosure may also include a system that supports on-the-fly, view-dependent LOD generation using post-decode quantization.

Figure 5:
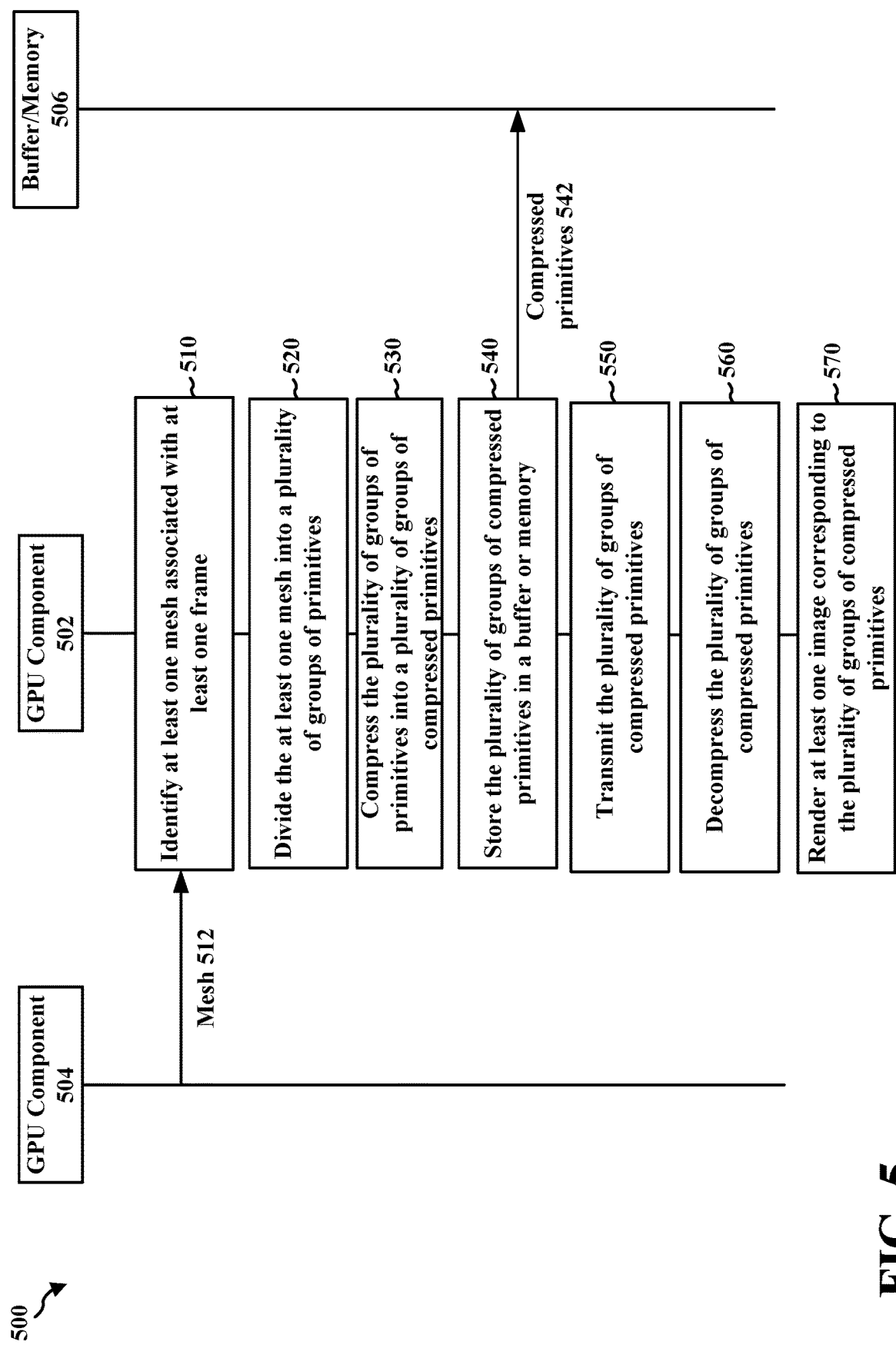
FIG. 5 is a communication flow diagram illustrating example communications between components in accordance with one or more techniques of this disclosure.

FIG. 5 is a communication flow diagram 500 of graphics processing in accordance with one or more techniques of this disclosure. As shown in FIG. 5, diagram 500 includes example communications between GPU component 502 (e.g., server or client device), GPU component 504 (e.g., server or client device), and buffer/memory 506 in accordance with one or more techniques of this disclosure.

At 510, GPU component 502 may identify at least one mesh associated with at least one frame, e.g., mesh 512. For example, GPU component 502 may receive at least one mesh associated with at least one frame, e.g., mesh 512, from GPU component 504.

At 520, GPU component 502 may divide the at least one mesh into a plurality of groups of primitives, each of the plurality of groups of primitives including at least one primitive and a plurality of vertices. Each of the plurality of groups of primitives may correspond to a meshlet. In some instances, a first group of primitives of the plurality of groups of primitives may be connected or adjacent to a second group of primitives of the plurality of groups of primitives, where at least one vertex of the first group of primitives may correspond to at least one vertex of the second group of primitives. Also, the at least one vertex of the first group of primitives or the at least one vertex of the second group of primitives may be stored in the first group of primitives or the second group of primitives.

At 530, GPU component 502 may compress the plurality of groups of primitives into a plurality of groups of compressed primitives, the plurality of groups of compressed primitives being associated with random access.

At 540, GPU component 502 may store the plurality of groups of compressed primitives, e.g., compressed primitives 542, in a buffer or memory, e.g., buffer/memory 506.

At 550, GPU component 502 may transmit the plurality of groups of compressed primitives. For example, GPU component 502 may transmit compressed primitives 542 to GPU component 504 or buffer/memory 506. In some aspects, the plurality of groups of compressed primitives may be transmitted via one or more data packets. The one or more data packets may be one or more independent data packets or one or more user datagram protocol (UDP) packets.

At 560, GPU component 502 may decompress the plurality of groups of compressed primitives, where at least one first group of the plurality of groups of compressed primitives may be decompressed in parallel with at least one second group of the plurality of groups of compressed primitives.

In some aspects, the plurality of groups of compressed primitives may be decompressed by at least one of a mesh shader or an amplification shader. The at least one first group of the plurality of groups of compressed primitives may be decompressed by the mesh shader or the amplification shader in parallel with the at least one second group of the plurality of groups of compressed primitives. At least one vertex in the at least one first group may be decompressed in parallel with at least one other vertex in the at least one first group. At least one primitive in the at least one first group may be decompressed in parallel with at least one other primitive in the at least one first group. At least one vertex in the at least one second group may be decompressed in parallel with at least one other vertex in the at least one second group. At least one primitive in the at least one second group may be decompressed in parallel with at least one other primitive in the at least one second group.

At 570, GPU component 502 may render, upon decompressing the plurality of groups of compressed primitives, at least one image corresponding to the plurality of groups of compressed primitives. In some aspects, one or more groups of compressed primitives of the plurality of groups of compressed primitives may be decompressed and rendered prior to one or more other groups of compressed primitives of the plurality of groups of compressed primitives.

Figure 6:
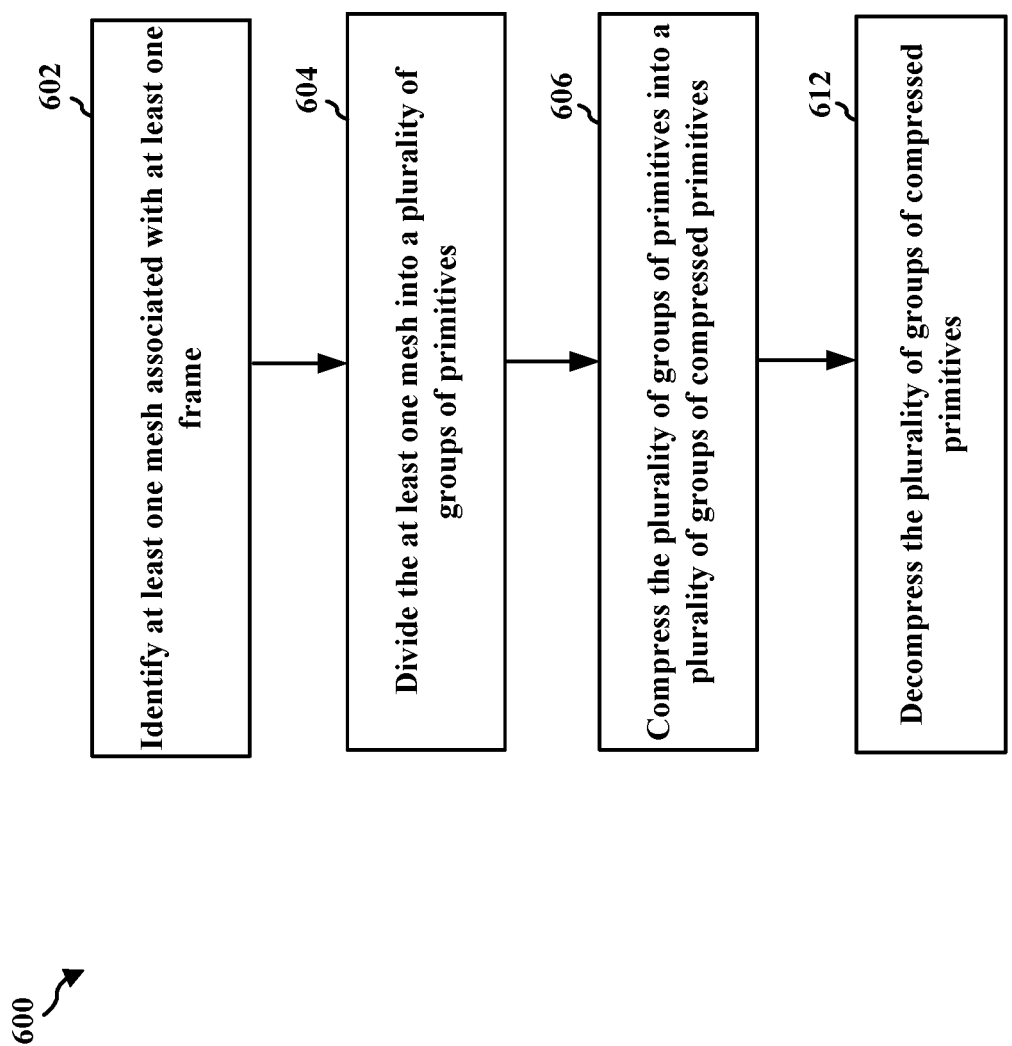
FIG. 6 illustrates an example flowchart of an example method in accordance with one or more techniques of this disclosure.

FIG. 6 illustrates an example flowchart 600 of an example method in accordance with one or more techniques of this disclosure. The method may be performed by an apparatus such as a server, a client device, a GPU, a CPU, or an apparatus for graphics processing.

At 602, the apparatus may identify at least one mesh associated with at least one frame, as described in connection with the examples in FIGS. 2-5. For example, GPU component 502 may identify at least one mesh associated with at least one frame, as described in 510 of FIG. 5. Further, processing unit 120 in FIG. 1 may perform step 602.

At 604, the apparatus may divide the at least one mesh into a plurality of groups of primitives, each of the plurality of groups of primitives including at least one primitive and a plurality of vertices, as described in connection with the examples in FIGS. 2-5. For example, GPU component 502 may divide the at least one mesh into a plurality of groups of primitives, each of the plurality of groups of primitives including at least one primitive and a plurality of vertices, as described in 520 of FIG. 5. Further, processing unit 120 in FIG. 1 may perform step 604. Each of the plurality of groups of primitives may correspond to a meshlet. In some instances, a first group of primitives of the plurality of groups of primitives may be connected or adjacent to a second group of primitives of the plurality of groups of primitives, where at least one vertex of the first group of primitives may correspond to at least one vertex of the second group of primitives. Also, the at least one vertex of the first group of primitives or the at least one vertex of the second group of primitives may be stored in the first group of primitives or the second group of primitives.

At 606, the apparatus may compress the plurality of groups of primitives into a plurality of groups of compressed primitives, the plurality of groups of compressed primitives being associated with random access, as described in connection with the examples in FIGS. 2-5. For example, GPU component 502 may compress the plurality of groups of primitives into a plurality of groups of compressed primitives, the plurality of groups of compressed primitives being associated with random access, as described in 530 of FIG. 5. Further, processing unit 120 in FIG. 1 may perform step 606.

At 612, the apparatus may decompress the plurality of groups of compressed primitives, at least one first group of the plurality of groups of compressed primitives being decompressed in parallel with at least one second group of the plurality of groups of compressed primitives, as described in connection with the examples in FIGS. 2-5. For example, GPU component 502 may decompress the plurality of groups of compressed primitives, at least one first group of the plurality of groups of compressed primitives being decompressed in parallel with at least one second group of the plurality of groups of compressed primitives, as described in 560 of FIG. 5. Further, processing unit 120 in FIG. 1 may perform step 612.

In some aspects, the plurality of groups of compressed primitives may be decompressed by at least one of a mesh shader or an amplification shader. The at least one first group of the plurality of groups of compressed primitives may be decompressed by the mesh shader or the amplification shader in parallel with the at least one second group of the plurality of groups of compressed primitives. At least one vertex in the at least one first group may be decompressed in parallel with at least one other vertex in the at least one first group. At least one primitive in the at least one first group may be decompressed in parallel with at least one other primitive in the at least one first group. At least one vertex in the at least one second group may be decompressed in parallel with at least one other vertex in the at least one second group. At least one primitive in the at least one second group may be decompressed in parallel with at least one other primitive in the at least one second group.

Figure 7:
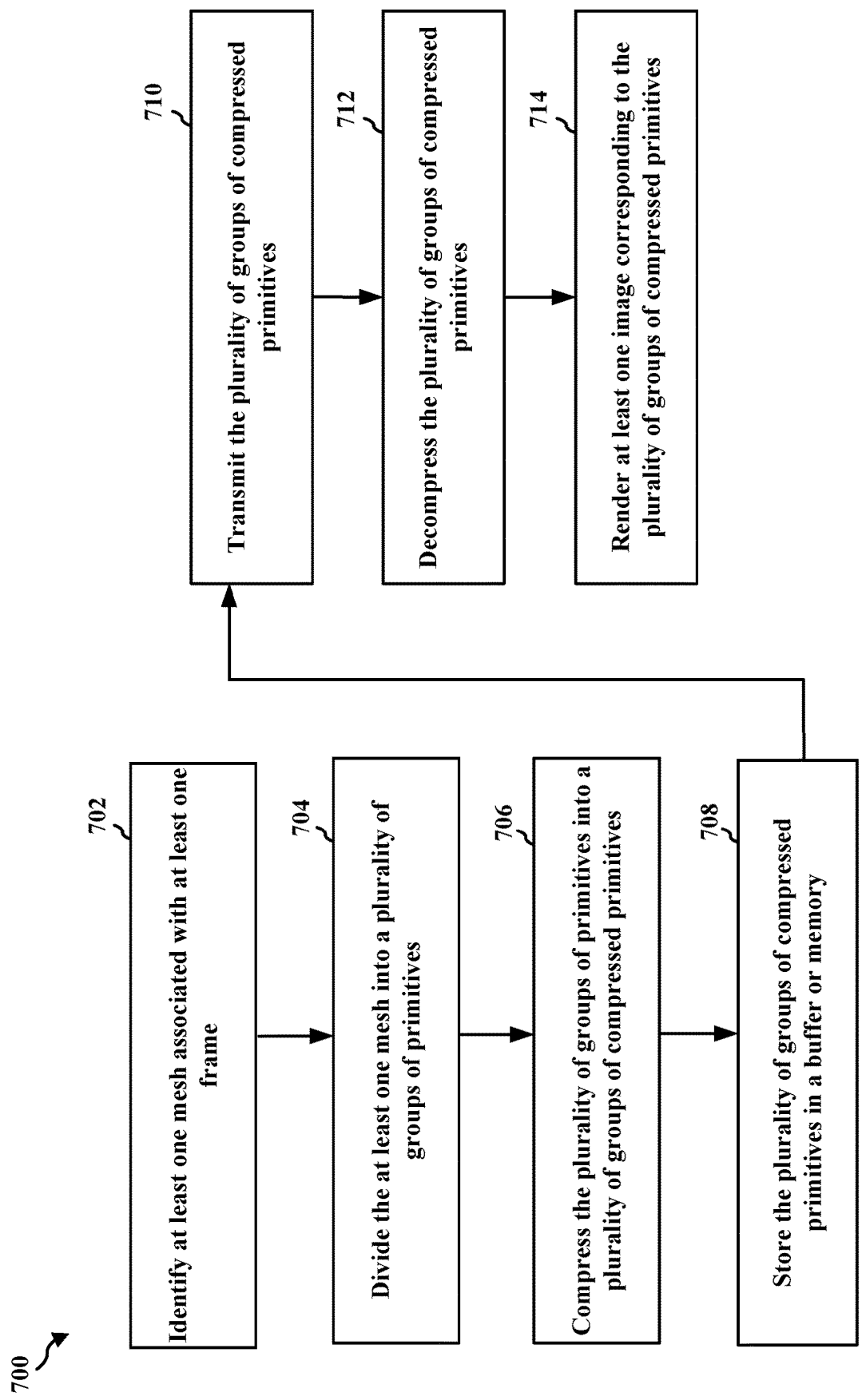
FIG. 7 illustrates an example flowchart of an example method in accordance with one or more techniques of this disclosure.

FIG. 7 illustrates an example flowchart 700 of an example method in accordance with one or more techniques of this disclosure. The method may be performed by an apparatus such as a server, a client device, a GPU, a CPU, or an apparatus for graphics processing.

At 702, the apparatus may identify at least one mesh associated with at least one frame, as described in connection with the examples in FIGS. 2-5. For example, GPU component 502 may identify at least one mesh associated with at least one frame, as described in 510 of FIG. 5. Further, processing unit 120 in FIG. 1 may perform step 702.

At 704, the apparatus may divide the at least one mesh into a plurality of groups of primitives, each of the plurality of groups of primitives including at least one primitive and a plurality of vertices, as described in connection with the examples in FIGS. 2-5. For example, GPU component 502 may divide the at least one mesh into a plurality of groups of primitives, each of the plurality of groups of primitives including at least one primitive and a plurality of vertices, as described in 520 of FIG. 5. Further, processing unit 120 in FIG. 1 may perform step 704. Each of the plurality of groups of primitives may correspond to a meshlet. In some instances, a first group of primitives of the plurality of groups of primitives may be connected or adjacent to a second group of primitives of the plurality of groups of primitives, where at least one vertex of the first group of primitives may correspond to at least one vertex of the second group of primitives. Also, the at least one vertex of the first group of primitives or the at least one vertex of the second group of primitives may be stored in the first group of primitives or the second group of primitives.

At 706, the apparatus may compress the plurality of groups of primitives into a plurality of groups of compressed primitives, the plurality of groups of compressed primitives being associated with random access, as described in connection with the examples in FIGS. 2-5. For example, GPU component 502 may compress the plurality of groups of primitives into a plurality of groups of compressed primitives, the plurality of groups of compressed primitives being associated with random access, as described in 530 of FIG. 5. Further, processing unit 120 in FIG. 1 may perform step 706.

At 708, the apparatus may store the plurality of groups of compressed primitives in a buffer or memory, as described in connection with the examples in FIGS. 2-5. For example, GPU component 502 may store the plurality of groups of compressed primitives in a buffer or memory, as described in 540 of FIG. 5. Further, processing unit 120 in FIG. 1 may perform step 708.

At 710, the apparatus may transmit the plurality of groups of compressed primitives, as described in connection with the examples in FIGS. 2-5. For example, GPU component 502 may transmit the plurality of groups of compressed primitives, as described in 550 of FIG. 5. Further, processing unit 120 in FIG. 1 may perform step 710. In some aspects, the plurality of groups of compressed primitives may be transmitted via one or more data packets. The one or more data packets may be one or more independent data packets or one or more user datagram protocol (UDP) packets.

At 712, the apparatus may decompress the plurality of groups of compressed primitives, at least one first group of the plurality of groups of compressed primitives being decompressed in parallel with at least one second group of the plurality of groups of compressed primitives, as described in connection with the examples in FIG. 2. For example, GPU component 702 may decompress the plurality of groups of compressed primitives, at least one first group of the plurality of groups of compressed primitives being decompressed in parallel with at least one second group of the plurality of groups of compressed primitives, as described in 760 of FIG. 7. Further, processing unit 120 in FIG. 1 may perform step 912.

In some aspects, the plurality of groups of compressed primitives may be decompressed by at least one of a mesh shader or an amplification shader. The at least one first group of the plurality of groups of compressed primitives may be decompressed by the mesh shader or the amplification shader in parallel with the at least one second group of the plurality of groups of compressed primitives. At least one vertex in the at least one first group may be decompressed in parallel with at least one other vertex in the at least one first group. At least one primitive in the at least one first group may be decompressed in parallel with at least one other primitive in the at least one first group. At least one vertex in the at least one second group may be decompressed in parallel with at least one other vertex in the at least one second group. At least one primitive in the at least one second group may be decompressed in parallel with at least one other primitive in the at least one second group.

At 914, the apparatus may render, upon decompressing the plurality of groups of compressed primitives, at least one image corresponding to the plurality of groups of compressed primitives, as described in connection with the examples in FIGS. 2-7. For example, GPU component 702 may render, upon decompressing the plurality of groups of compressed primitives, at least one image corresponding to the plurality of groups of compressed primitives, as described in 770 of FIG. 7. Further, processing unit 120 in FIG. 1 may perform step 714. In some aspects, one or more groups of compressed primitives of the plurality of groups of compressed primitives may be decompressed and rendered prior to one or more other groups of compressed primitives of the plurality of groups of compressed primitives.

In one configuration, a method or apparatus for graphics processing is provided. The apparatus may be a server, a client device, a CPU, a GPU, or some other processor that may perform graphics processing. In one aspect, the apparatus may be the processing unit 120 within the device 104, or may be some other hardware within device 104 or another device. The apparatus, e.g., processing unit 120, may include means for identifying at least one mesh associated with at least one frame; means for dividing the at least one mesh into a plurality of groups of primitives, each of the plurality of groups of primitives including at least one primitive and a plurality of vertices; means for compressing the plurality of groups of primitives into a plurality of groups of compressed primitives, the plurality of groups of compressed primitives being associated with random access; means for decompressing the plurality of groups of compressed primitives, at least one first group of the plurality of groups of compressed primitives being decompressed in parallel with at least one second group of the plurality of groups of compressed primitives; means for rendering, upon decompressing the plurality of groups of compressed primitives, at least one image corresponding to the plurality of groups of compressed primitives; means for storing the plurality of groups of compressed primitives in a buffer or memory; and means for transmitting the plurality of groups of compressed primitives.

The subject matter described herein may be implemented to realize one or more benefits or advantages. For instance, the described graphics processing techniques may be used by a server, a client device, a GPU, a CPU, or some other processor that may perform graphics processing to implement the split rendering techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may include a split rendering process that may utilize compressed geometry rendering and streaming to reduce the amount of bandwidth utilized, reduce power consumption, and/or improve processing speed.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the claims.

The following aspects are illustrative only and may be combined with other aspects or teachings described herein, without limitation.

Aspect 1 is an apparatus for graphics processing including at least one processor coupled to a memory and configured to: identify at least one mesh associated with at least one frame; divide the at least one mesh into a plurality of groups of primitives, each of the plurality of groups of primitives including at least one primitive and a plurality of vertices; compress the plurality of groups of primitives into a plurality of groups of compressed primitives, the plurality of groups of compressed primitives being associated with random access; and decompress the plurality of groups of compressed primitives, at least one first group of the plurality of groups of compressed primitives being decompressed in parallel with at least one second group of the plurality of groups of compressed primitives.

Aspect 2 is the apparatus of aspect 1, where the at least one processor is further configured to: render, upon decompressing the plurality of groups of compressed primitives, at least one image corresponding to the plurality of groups of compressed primitives.

Aspect 3 is the apparatus of any of aspects 1 and 2, where one or more groups of compressed primitives of the plurality of groups of compressed primitives are decompressed and rendered prior to one or more other groups of compressed primitives of the plurality of groups of compressed primitives.

Aspect 4 is the apparatus of any of aspects 1 to 3, where the plurality of groups of compressed primitives are decompressed by at least one of a mesh shader or an amplification shader.

Aspect 5 is the apparatus of any of aspects 1 to 4, where the at least one first group of the plurality of groups of compressed primitives is decompressed by the mesh shader or the amplification shader in parallel with the at least one second group of the plurality of groups of compressed primitives.

Aspect 6 is the apparatus of any of aspects 1 to 5, where at least one vertex in the at least one first group is decompressed in parallel with at least one other vertex in the at least one first group; or where at least one primitive in the at least one first group is decompressed in parallel with at least one other primitive in the at least one first group.

Aspect 7 is the apparatus of any of aspects 1 to 6, where at least one vertex in the at least one second group is decompressed in parallel with at least one other vertex in the at least one second group; or where at least one primitive in the at least one second group is decompressed in parallel with at least one other primitive in the at least one second group.

Aspect 8 is the apparatus of any of aspects 1 to 7, where each of the plurality of groups of primitives corresponds to a meshlet.

Aspect 9 is the apparatus of any of aspects 1 to 8, where a first group of primitives of the plurality of groups of primitives is connected or adjacent to a second group of primitives of the plurality of groups of primitives, where at least one vertex of the first group of primitives corresponds to at least one vertex of the second group of primitives.

Aspect 10 is the apparatus of any of aspects 1 to 9, where the at least one vertex of the first group of primitives or the at least one vertex of the second group of primitives is stored in the first group of primitives or the second group of primitives.

Aspect 11 is the apparatus of any of aspects 1 to 10, where the at least one processor is further configured to: store the plurality of groups of compressed primitives in a buffer or memory.

Aspect 12 is the apparatus of any of aspects 1 to 11, where the at least one processor is further configured to: transmit the plurality of groups of compressed primitives.

Aspect 13 is the apparatus of any of aspects 1 to 12, where the plurality of groups of compressed primitives is transmitted via one or more data packets.

Aspect 14 is the apparatus of any of aspects 1 to 13, where the one or more data packets are one or more independent data packets or one or more user datagram protocol (UDP) packets.

Aspect 15 is the apparatus of any of aspects 1 to 14, further including a transceiver coupled to the at least one processor.

Aspect 16 is a method of wireless communication for implementing any of aspects 1 to 15.

Aspect 17 is an apparatus for wireless communication including means for implementing any of aspects 1 to 15.

Aspect 18 is a computer-readable medium storing computer executable code, where the code when executed by a processor causes the processor to implement any of aspects 1 to 15.

What is claimed is:

1. An apparatus for graphics processing, comprising:
   memory;
   at least one processor coupled to the memory and configured to:
      identify at least one mesh associated with at least one frame;
      divide the at least one mesh into a plurality of groups of primitives, each of the plurality of groups of primitives including at least one primitive and a plurality of vertices;
      compress the plurality of groups of primitives into a plurality of groups of compressed primitives, the plurality of groups of compressed primitives being associated with random access;
      decompress the plurality of groups of compressed primitives, wherein the at least one processor is configured to decompress at least one first group of the plurality of groups of compressed primitives in a first level-of-detail (LOD) in parallel with at least one second group of the plurality of groups of compressed primitives in a second LOD, wherein the at least one processor is configured to decompress at least one first primitive in the at least one first group in parallel with at least one other first primitive in the at least one first group and decompress at least one second primitive in the at least one second group in parallel with at least one other second primitive in the at least one second group, and wherein the at least one processor is configured to decompress and render one or more groups of compressed primitives of the plurality of groups of compressed primitives prior to one or more other groups of compressed primitives of the plurality of groups of compressed primitives, wherein the at least one first group of the plurality of groups of compressed primitives is adjacent to the at least one second group of the plurality of groups of compressed primitives, wherein at least one vertex of the at least one first group corresponds to at least one other vertex of the at least one second group, wherein the at least one processor is configured to store the at least one vertex of the at least one first group in the at least one first group, and wherein the at least one processor is configured to store the at least one other vertex of the at least one second group in the at least one second group; and
   a transceiver coupled to the at least one processor, wherein the first LOD is a coarse LOD and the second LOD is a fine LOD such that the first LOD is coarser than the second LOD, wherein a first number of primitives in the at least one first group is less than a second number of primitives in the at least one second group, such that the first number of primitives in the at least one first group that is decompressed in the first LOD is less than, and decompressed in parallel with, the second number of primitives in the at least one second group that is decompressed in the second LOD.

2. The apparatus of claim 1, wherein the at least one processor is configured to decompress the at least one first group of the plurality of groups of compressed primitives with at least one of a mesh shader or an amplification shader in parallel with the at least one second group of the plurality of groups of compressed primitives.

3. The apparatus of claim 2, wherein the at least one processor is configured to decompress at least one vertex in the at least one first group in parallel with at least one other vertex in the at least one first group.

4. The apparatus of claim 2, wherein the at least one processor is configured to decompress at least one vertex in the at least one second group in parallel with at least one other vertex in the at least one second group.

5. The apparatus of claim 1, wherein each of the plurality of groups of primitives corresponds to a meshlet.

6. The apparatus of claim 1, wherein the at least one processor is further configured to:
   store the plurality of groups of compressed primitives in a buffer or a first memory.

7. The apparatus of claim 1, wherein the at least one processor is configured to transmit the plurality of groups of compressed primitives via one or more data packets, wherein the one or more data packets are one or more independent data packets or one or more user datagram protocol (UDP) packets.

8. The apparatus of claim 1, wherein the at least one processor is further configured to:
   render, upon decompressing the plurality of groups of compressed primitives, at least one image corresponding to the plurality of groups of compressed primitives; and
   transmit the plurality of groups of compressed primitives, wherein the at least one processor is configured to decompress the plurality of groups of compressed primitives with at least one of a mesh shader or an amplification shader; and
   wherein the at least one processor is configured to transmit the plurality of groups of compressed primitives via one or more data packets.

9. A method of graphics processing, comprising:
   identifying at least one mesh associated with at least one frame;
   dividing the at least one mesh into a plurality of groups of primitives, each of the plurality of groups of primitives including at least one primitive and a plurality of vertices;
   compressing the plurality of groups of primitives into a plurality of groups of compressed primitives, the plurality of groups of compressed primitives being associated with random access; and
   decompressing the plurality of groups of compressed primitives, wherein at least one first group of the plurality of groups of compressed primitives is decompressed in a first level-of-detail (LOD) in parallel with at least one second group of the plurality of groups of compressed primitives in a second LOD, wherein at least one first primitive in the at least one first group is decompressed in parallel with at least one other first primitive in the at least one first group and at least one second primitive in the at least one second group is decompressed in parallel with at least one other second primitive in the at least one second group, wherein one or more groups of compressed primitives of the plurality of groups of compressed primitives are decompressed and rendered prior to one or more other groups of compressed primitives of the plurality of groups of compressed primitives, wherein the at least one first group of the plurality of groups of compressed primitives is adjacent to the at least one second group of the plurality of groups of compressed primitives, wherein at least one vertex of the at least one first group corresponds to at least one other vertex of the at least one second group, wherein the at least one vertex of the at least one first group is stored in the at least one first group, and wherein the at least one other vertex of the at least one second group is stored in the at least one second group, wherein the first LOD is a coarse LOD and the second LOD is a fine LOD such that the first LOD is coarser than the second LOD, wherein a first number of primitives in the at least one first group is less than a second number of primitives in the at least one second group, such that the first number of primitives in the at least one first group that is decompressed in the first LOD is less than, and decompressed in parallel with, the second number of primitives in the at least one second group that is decompressed in the second LOD.

10. The method of claim 9, wherein the at least one first group of the plurality of groups of compressed primitives is decompressed by at least one of a mesh shader or an amplification shader in parallel with the at least one second group of the plurality of groups of compressed primitives.

11. The method of claim 10, wherein at least one vertex in the at least one first group is decompressed in parallel with at least one other vertex in the at least one first group.

12. The method of claim 10, wherein at least one vertex in the at least one second group is decompressed in parallel with at least one other vertex in the at least one second group.

13. The method of claim 9, wherein each of the plurality of groups of primitives corresponds to a meshlet.

14. The method of claim 9, further comprising:
storing the plurality of groups of compressed primitives in a buffer or memory.

15. The method of claim 9, wherein the plurality of groups of compressed primitives are transmitted via one or more data packets, wherein the one or more data packets are one or more independent data packets or one or more user datagram protocol (UDP) packets.

16. The method of claim 9, further comprising:
rendering, upon decompressing the plurality of groups of compressed primitives, at least one image corresponding to the plurality of groups of compressed primitives; and
transmitting the plurality of groups of compressed primitives,
wherein the plurality of groups of compressed primitives are decompressed by at least one of a mesh shader or an amplification shader, and
wherein the plurality of groups of compressed primitives are transmitted via one or more data packets.

17. An apparatus for graphics processing, comprising:
means for identifying at least one mesh associated with at least one frame;
means for dividing the at least one mesh into a plurality of groups of primitives, each of the plurality of groups of primitives including at least one primitive and a plurality of vertices;
means for compressing the plurality of groups of primitives into a plurality of groups of compressed primitives, the plurality of groups of compressed primitives being associated with random access; and
means for decompressing the plurality of groups of compressed primitives, wherein at least one first group of the plurality of groups of compressed primitives is decompressed in a first level-of-detail (LOD) in parallel with at least one second group of the plurality of groups of compressed primitives in a second LOD, wherein at least one first primitive in the at least one first group is decompressed in parallel with at least one other first primitive in the at least one first group and at least one second primitive in the at least one second group is decompressed in parallel with at least one other second primitive in the at least one second group, wherein one or more groups of compressed primitives of the plurality of groups of compressed primitives are decompressed and rendered prior to one or more other groups of compressed primitives of the plurality of groups of compressed primitives, wherein the at least one first group of the plurality of groups of compressed primitives is adjacent to the at least one second group of the plurality of groups of compressed primitives, wherein at least one vertex of the at least one first group corresponds to at least one other vertex of the at least one second group, wherein the at least one vertex of the at least one first group is stored in the at least one first group, and wherein the at least one other vertex of the at least one second group is stored in the at least one second group, wherein the first LOD is a coarse LOD and the second LOD is a fine LOD such that the first LOD is coarser than the second LOD, wherein a first number of primitives in the at least one first group is less than a second number of primitives in the at least one second group, such that the first number of primitives in the at least one first group that is decompressed in the first LOD is less than, and decompressed in parallel with, the second number of primitives in the at least one second group that is decompressed in the second LOD.

18. The apparatus of claim 17, further comprising:
means for rendering, upon decompressing the plurality of groups of compressed primitives, at least one image corresponding to the plurality of groups of compressed primitives; and
means for transmitting the plurality of groups of compressed primitives,
wherein the plurality of groups of compressed primitives are decompressed by at least one of a mesh shader or an amplification shader, and
wherein the plurality of groups of compressed primitives are transmitted via one or more data packets.

19. A non-transitory computer-readable medium storing computer executable code for graphics processing, the code when executed by a processor causes the processor to:
identify at least one mesh associated with at least one frame;

divide the at least one mesh into a plurality of groups of primitives, each of the plurality of groups of primitives including at least one primitive and a plurality of vertices;

compress the plurality of groups of primitives into a plurality of groups of compressed primitives, the plurality of groups of compressed primitives being associated with random access; and decompress the plurality of groups of compressed primitives, wherein at least one first group of the plurality of groups of compressed primitives is decompressed in a first level-of-detail (LOD) in parallel with at least one second group of the plurality of groups of compressed primitives in a second LOD, wherein at least one first primitive in the at least one first group is decompressed in parallel with at least one other first primitive in the at least one first group and at least one second primitive in the at least one second group is decompressed in parallel with at least one other second primitive in the at least one second group, wherein one or more groups of compressed primitives of the plurality of groups of compressed primitives are decompressed and rendered prior to one or more other groups of compressed primitives of the plurality of groups of compressed primitives, wherein the at least one first group of the plurality of groups of compressed primitives is adjacent to the at least one second group of the plurality of groups of compressed primitives, wherein at least one vertex of the at least one first group corresponds to at least one other vertex of the at least one second group, wherein the at least one vertex of the at least one first group of primitives is stored in the at least one first group, and wherein the at least one other vertex of the at least one second group is stored in the at least one second group, wherein the first LOD is a coarse LOD and the second LOD is a fine LOD such that the first LOD is coarser than the second LOD, wherein a first number of primitives in the at least one first group is less than a second number of primitives in the at least one second group, such that the first number of primitives in the at least one first group that is decompressed in the first LOD is less than, and decompressed in parallel with, the second number of primitives in the at least one second group that is decompressed in the second LOD.

* * * * *